(12) United States Patent
Dakroub et al.

(10) Patent No.: US 6,349,009 B1
(45) Date of Patent: Feb. 19, 2002

(54) HEAD ASSEMBLY WITH INTEGRATED WRITE CURRENT SHAPING CIRCUIT

(75) Inventors: Housan Dakroub; Hieu V. Nguyen, both of Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/326,069

(22) Filed: Jun. 4, 1999

Related U.S. Application Data

(60) Provisional application No. 60/088,275, filed on Jun. 5, 1998.

(51) Int. Cl.[7] .............................. G11B 5/02; G11B 5/09
(52) U.S. Cl. ............................. 360/68; 360/45; 360/46; 360/245.9
(58) Field of Search .............................. 360/46, 66, 67, 360/65, 68, 245.9, 45

(56) References Cited

U.S. PATENT DOCUMENTS

| | | | |
|---|---|---|---|
| 4,244,008 A | 1/1981 | Holt | |
| 4,314,288 A * | 2/1982 | Gyi | 360/65 |
| 5,357,379 A | 10/1994 | Gower | |
| 5,426,537 A * | 6/1995 | Yeh et al. | 360/46 |
| 5,434,717 A | 7/1995 | Yoshinaga et al. | |
| 5,770,846 A * | 6/1998 | Mos et al. | 360/2 |
| 5,869,988 A | 2/1999 | Jusuf et al. | |
| 5,880,626 A | 3/1999 | Dean | |
| 6,125,015 A * | 9/2000 | Carlson et al. | 360/245.9 |

* cited by examiner

Primary Examiner—Regina Y. Neal
(74) Attorney, Agent, or Firm—Crowe & Dunlevy

(57) ABSTRACT

Apparatus for improving data writing operations to a disc recording surface of a disc drive. A head assembly is supported over the disc recording surface by a flexible suspension assembly of a controllably positionable actuator assembly and includes a write current shaping circuit integrated with a write element. The write current shaping circuit modifies write currents received by the head assembly via a transmission line from a preamplifier driver circuit to remove undesired characteristics from the received write currents. The write element writes data to the disc recording surface using the write currents as modified by the write current shaping circuit.

13 Claims, 5 Drawing Sheets

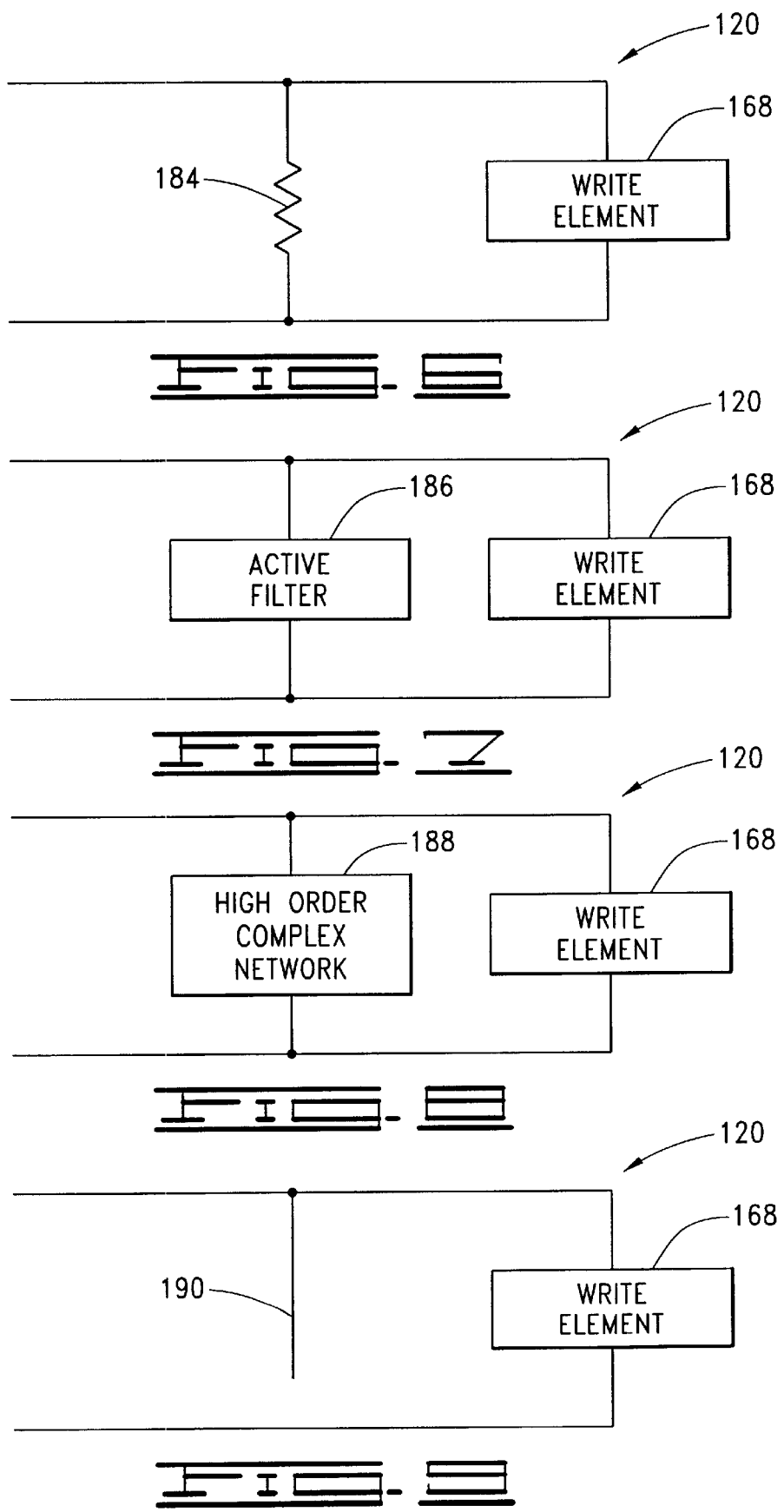

HEAD ASSEMBLY WITH INTEGRATED WRITE CURRENT SHAPING CIRCUIT

RELATED APPLICATIONS

This application claims the benefit of U.S. Provisional Application No. 60/088,275, filed Jun. 5, 1998.

FIELD OF THE INVENTION

This invention relates generally to the field of disc drive storage devices, and more particularly, but not by way of limitation, to improving data writing operations by incorporating a write current shaping circuit in a head assembly of a disc drive.

BACKGROUND OF THE INVENTION

Hard disc drives are used in modern computer systems to enable users to store and retrieve vast amounts of data in a fast and efficient manner. A typical disc drive is generally composed of a head/disc assembly (HDA) which houses requisite mechanical portions of the drive and a printed wiring assembly (PWA) which supports requisite electronic portions of the drive.

The HDA includes a base deck to which various components are mounted and a top cover which cooperates with the base deck to form a sealed housing to reduce particulate contamination. Within the housing, a disc stack is formed from one or more magnetic recording discs which are axially aligned for rotation by a spindle motor at a constant, high speed, such as 10,000 revolutions per minute during normal disc drive operation.

A rotary actuator assembly is mounted adjacent the disc stack and includes a plurality of rigid arms which extend into the stack between adjacent discs, as well as above and below the top and bottom discs. The rigid arms support flexible suspension assemblies which in turn, support a corresponding number of read/write heads adjacent the surfaces of the discs.

The electronics provided on the disc drive PWA primarily serve to control the operation of the HDA and to communicate with a host computer in which the disc drive is mounted. Generally, the top level functional blocks on the PWA include a read/write channel which controls the reading and writing of data from and to the discs, a spindle motor control circuit which controls the rotation of the spindle motor, and a servo control circuit which controls the position of the heads.

Each head typically includes a thin-film inductive write element to write data and a magneto-resistive (MR) read element to read previously written data. The write element generally comprises a ferromagnetic core about which a conductor is wrapped multiple times to form a coil. The core includes an air gap which is suspended in close proximity to the corresponding disc recording surface so that, as bidirectional write currents are pulsed through the conductor, magnetic fringing across the gap selectively magnetizes the surface.

Data are transduced from the surface by passing a read bias current through the MR read element and monitoring the voltage across the element; as the MR read element is subjected to the selective magnetization of the surface, the baseline electrical resistance of the element changes, allowing generation of a readback signal indicative of the data stored on the surface. Thus, each head is operably coupled to four conductor paths: two to accommodate the write currents supplied to the write element and two to accommodate the read bias currents applied to the MR read element.

A preamplifier/driver circuit is typically mounted to the side of the actuator assembly and includes a write driver circuit to apply the write currents to a selected write element during a write operation. The preamplifier/driver circuit further includes a bias current source which is sequentially connected to the appropriate read element to effect a read operation.

Because the data are stored as a series of magnetic flux reversals ("flux transitions") on the tracks, it is important to apply write currents that have well-defined transition characteristics. An ideal write current sequence generally resembles a square wave. However, factors such as electrical noise and transmission line effects can introduce significant distortion in a write current sequence, adversely affecting the ability of the read element to subsequently transduce the stored data. Such effects typically become more pronounced at higher data writing frequencies.

Prior art approaches to improving write current quality have included efforts to incorporate compensation circuitry (sometimes referred to as "damping networks") in the preamplifier/driver circuit. For example, U.S. Pat. No. 5,434,717 issued to Yoshinaga et al. discloses the use of damping resistors to reduce overshoot at current transitions. U.S. Pat. No. 5,357,379 issued to Gower employs a switchable resistor network to obtain optimal levels of impedance in both read and write modes. U.S. Pat. No. 5,880,626 issued to Dean discloses an active damping network formed from resistors, capacitors and transistors to compensate for oscillation (ringing) as the write current settles to the desired direct current (dc) value and to provide faster transition times as compared to straight damping resistor configurations.

While operable, as write frequencies continue to increase, there remains a continued need for improvements in the art whereby write current quality can be maintained at adequate levels to ensure reliable readback of the data. It is to such ends that the present invention is directed.

SUMMARY OF THE INVENTION

The present invention is directed to an apparatus for improving write performance in a disc drive.

In accordance with preferred embodiments, a disc drive is provided with a rotatable disc comprising a recording surface and an actuator assembly adjacent the disc comprising a flexible suspension assembly and a preamplifier/driver circuit which outputs a series of write currents indicative of data to be written to the recording surface.

The disc drive further has a head assembly, supported by the flexible suspension assembly adjacent the recording surface, which includes a write element and a write current shaping circuit. The write current shaping circuit modifies the sequence of write currents output by the preamplifier/driver circuit to improve operation of the write element in writing the data to the recording surface in relation to the modified sequence of write currents.

These and various other features as well as advantages which characterize the present invention will be apparent from a reading of the following detailed description and a review of the associated drawings.

BRIEF DESCRIPTION OF THE DRAWINGS

FIG. 5 provides a functional block diagram showing the relationship between a write driver circuit of the preamplifier/driver circuit and the head assembly in accordance with preferred embodiments of the present invention.

FIG. 6 illustrates the head assembly 120 of FIG. 5 in accordance with a preferred embodiment wherein the write current shaping circuit comprises a resistor.

FIG. 7 illustrates the head assembly 120 of FIG. 5 in accordance with a preferred embodiment wherein the write current shaping circuit comprises an active filter.

FIG. 8 illustrates the head assembly 120 of FIG. 5 in accordance with a preferred embodiment wherein the write current shaping circuit comprises a high order complex network.

FIG. 9 illustrates the head assembly 120 of FIG. 5 in accordance with a preferred embodiment wherein the write current shaping circuit comprises a section of additional transmission line.

DETAILED DESCRIPTION

Figure 1:
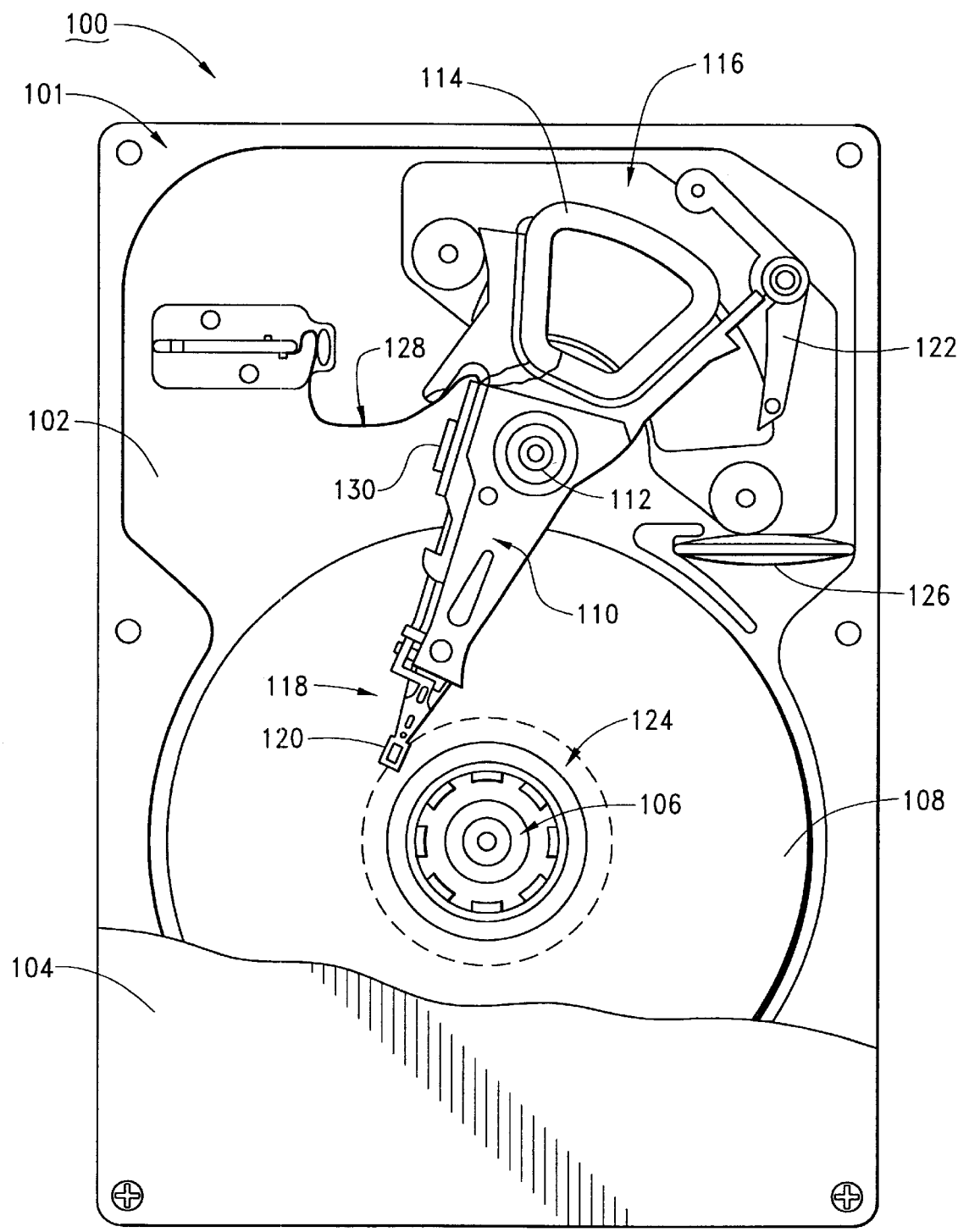
FIG. 1 is a top plan view of a disc drive constructed in accordance with preferred embodiments of the present invention.

Referring first to FIG. 1, shown therein is a top plan view of a disc drive 100 constructed in accordance with preferred embodiments of the present invention. The disc drive 100 is formed of two primary assemblies: a head/disc assembly (HDA) 101 which composes substantially all of the mechanical portions of the disc drive, and a printed wiring assembly (PWA) which supports electronics used to control the operation of the HDA. The PWA is mounted to the underside of the HDA 101 and is thus not visible in FIG. 1.

The HDA 101 includes a base deck 102 to which various disc drive components are mounted. A top cover 104, shown in partial cutaway fashion, cooperates with the base deck 102 to form a sealed housing for the HDA 101. A spindle motor 106 is provided to rotate a plurality of discs 108 at a constant high speed during normal disc drive operation. For reference, each of the discs 108 has a nominal diameter of 84 millimeters (3.3 inches), and the disc drive 100 has external dimensions which conform to what is commonly referred to in the industry as a "3½ inch" form factor.

To access the discs 108, a controllably positionable actuator assembly 110 (also referred to as an "e-block") is provided which rotates via a cartridge bearing assembly 112 in response to currents applied to a coil 114 of a voice coil motor (VCM, a portion of which is shown at 116). A plurality of flexible suspension assemblies 118 extend to support a corresponding plurality of read/write head assemblies 120 over the discs 108. The head assemblies 120 are positionably located over data tracks (not shown) of the discs 108 in order to read data from and write data to the tracks, respectively. The construction of the head assemblies 120 in accordance with preferred embodiments will be discussed in greater detail below, but at this point it will be noted that the head assemblies 120 are preferably characterized as magneto-resistive (MR), in that each head assembly includes a thin film inductive write element and a MR read element.

A magnetic latch assembly 122 latches the actuator assembly 110 when the disc drive 100 is deactivated so that the head assemblies 108 are brought to rest upon texturized landing zones 124 near the innermost diameters of the discs 108. A recirculation air filter 126 filters out airborne particulate contamination as air is channeled from the rotating discs 108 to cool the actuator coil 114.

A flex circuit assembly 128 facilitates electrical communication between the actuator assembly 110 and the disc drive PWA. The flex circuit assembly 128 includes a preamplifier/driver circuit 130 which applies read bias and write currents to the head assemblies 120.

Figures 2, 3:
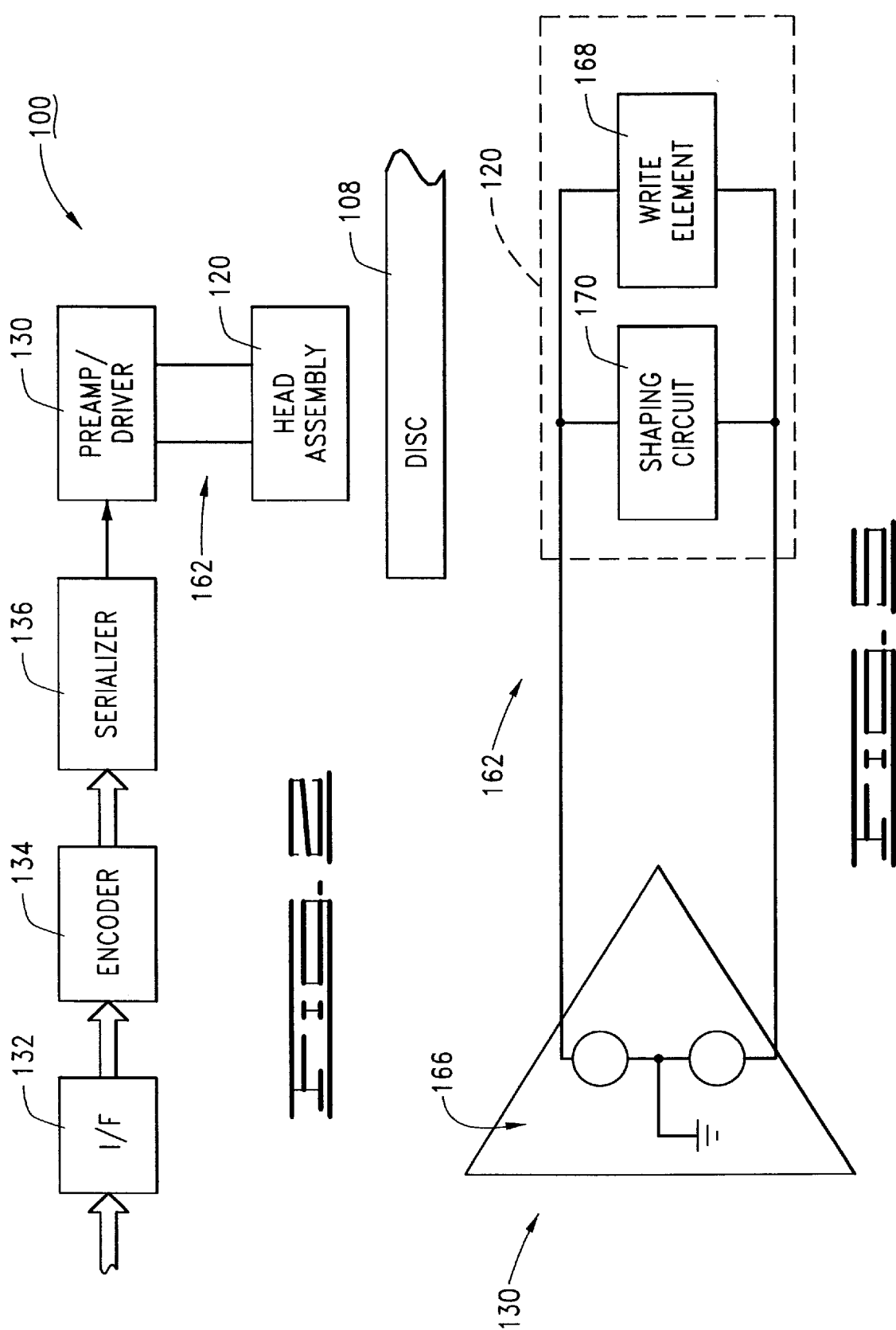
FIG. 2 provides a functional block diagram of circuitry utilized by the disc drive to write data to the disc recording surfaces.
FIG. 3 provides graphical representations of a write current sequence with excessive distortion (ringing) and a write current sequence having desired characteristics.
Figure 3:
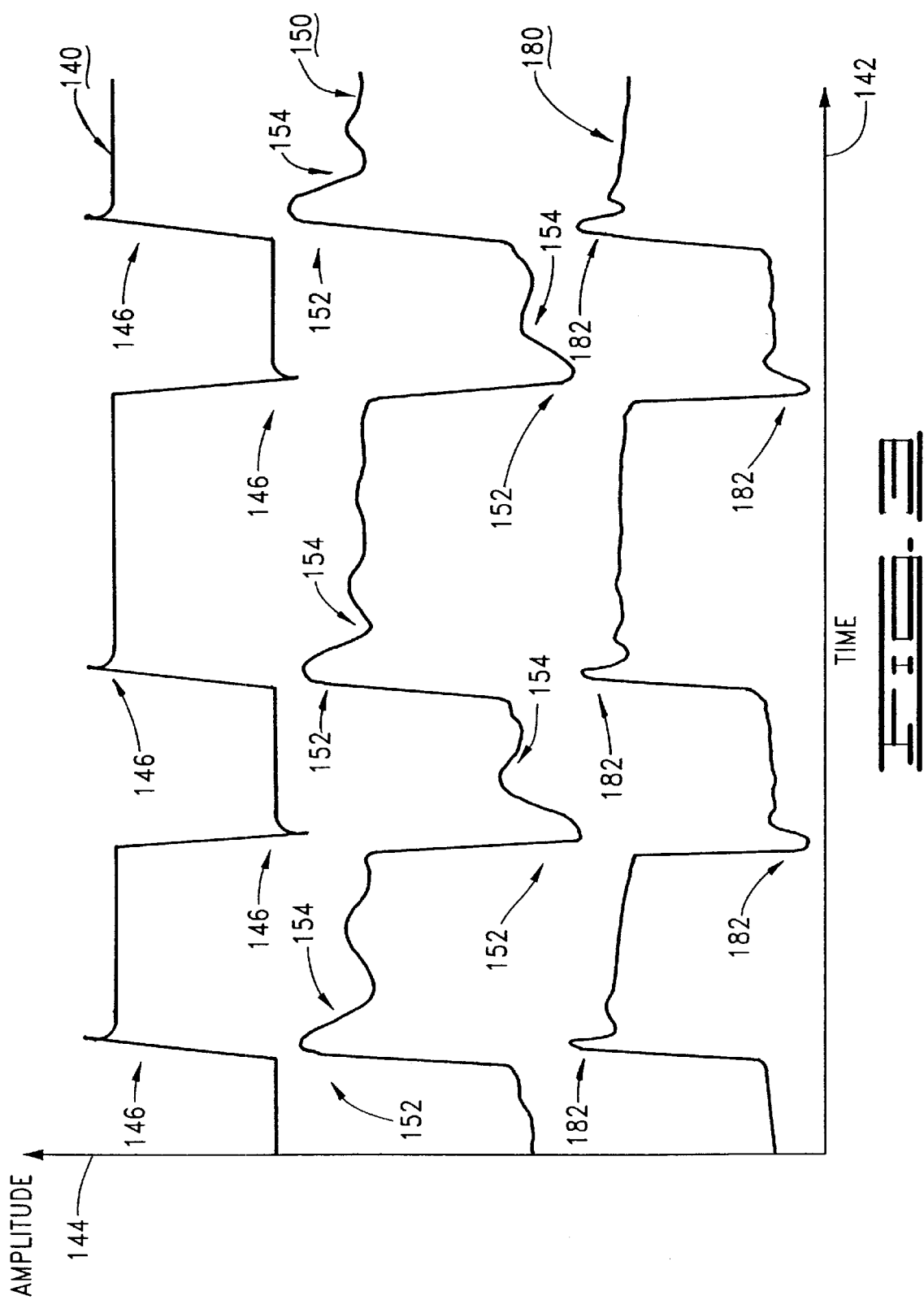

FIG. 2 provides a functional block diagram of circuitry utilized by the disc drive 100 to write data to the recording surfaces of the discs 108. It will be understood that selected portions of the circuitry of FIG. 2 reside on the aforementioned disc drive PWA.

An interface (I/F) circuit 132 buffers data provided by a host computer (not shown) in which the disc drive 100 is mounted in a user environment. The interface circuit 132 also controls the sequential transfer of data between the discs 108 and the host computer.

Data to be written are passed from the interface circuit 132 to a write channel (not designated), comprising an encoder circuit 134 which applies run-length limited (RLL) and error correction coding (ECC) to the data and a serializer circuit 136 which serializes the encoded data. The output sequence from the serializer circuit 136 is applied to the preamplifier/driver circuit 130 (also referred to as the "preamp/driver" or "preamp") which, in response thereto, applies write currents of selected magnitude, polarity and duration to the selected head assembly 120 to write the data to the associated disc recording surface.

An ideal sequence of write currents is graphically illustrated in FIG. 3 by curve 140, plotted against an x-axis 142 indicative of elapsed time and a y-axis 144 indicative of amplitude. As shown in FIG. 3, the curve 140 generally resembles a pulse-width modulated signal, with sharply defined transitions (at which flux reversals are recorded onto the disc recording surface) and steady-state direct current (dc) positive and negative current amplitudes. Small amounts of overshoot, as shown at 146, desirably compensate the magnetic properties of the write element. However, the ideal curve 140 is seldom observed in actual disc drives due to a variety of effects which contribute to distortions in the write currents, such as illustrated by curve 150. The curve 150 exhibits excessive overshoot (as indicated generally at 152) on both positive going and negative going transitions, as well as excessive ringing (settling) at 154 as the write current sequence settles to the dc positive and negative current amplitude values. Such distortions can arise, for example, due to preamplifier limitations and transmission line effects, and generally increase with increases in write frequency.

Of particular interest is the transmission line configuration between the preamp and the head assemblies; for write frequencies above a certain level (such as 1 gigabit per second), twisted pairs of conductors present too great an impedance to reliably write and read data to the discs 108. Hence, the disc drive 100 utilizes flex-on-suspension (FOS) to couple the preamp 130 to the head assemblies 120, as illustrated in FIG. 4.

Figure 4:
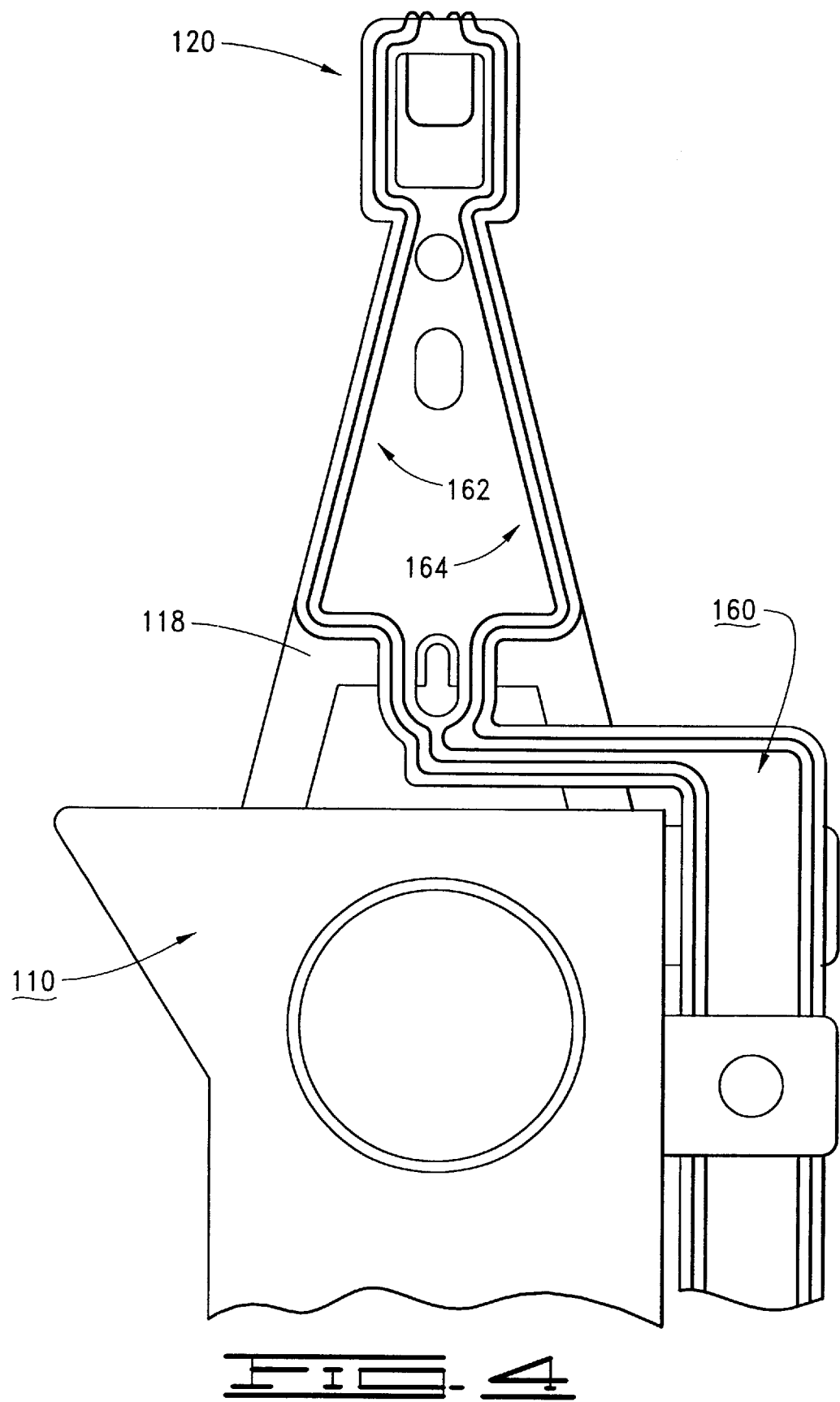
FIG. 4 shows portions of the actuator assembly of FIG. 1 in greater detail, and illustrates the use of flex-on-suspension (FOS) conductors to conduct read bias and write currents to the head assembly.

More particularly, FIG. 4 includes a FOS assembly 160 which is routed along the actuator assembly 110 and is supported on the suspension assembly 118 as shown. The FOS assembly 160 preferably comprises a pair of electrically insulating plastic layers (not separately designated) which encapsulate two separate pairs of conductors 162, 164 which transmit write currents and read bias currents, respectively, to the write and read elements of the head assembly 120. For reference, the conductors 162 used to carry the write currents has an operational impedance of about 85 ohms.

Referring now to FIG. 5, shown therein is a functional block diagram of a selected head assembly 120, constructed in accordance with preferred embodiments of the present invention. The head assembly 120 is shown to be operably coupled (via FOS conductors 162) to a driver circuit 166 of the preamp 130, with the driver circuit 166 transmitting write currents to the head assembly 120 during a write operation. It will be understood that portions of the head assembly 120 and the preamp 130 used to read data from the disc recording surfaces have been omitted from FIG. 5 for purposes of clarity.

The head assembly 120 is shown in FIG. 5 to include a write element 168 and a write current shaping circuit 170. The shaping circuit 170 operates to optimize the writing of data by the write element 168 by controllably modifying the write current sequence received by the head assembly 120 to a desired profile, such as graphically illustrated by curve 180 in FIG. 3. Particularly, the curve 180 exhibits excellent transition characteristics between positive and negative amplitudes, with controlled amounts of overshoot (indicated at 182) and minimal settling time at each amplitude. It will be noted that the curves 140, 150 and 180 are contemplated as representing write current sequences as presented to the write element 168, and not necessarily sequences output by the driver 166 (at the other end of the FOS conductors 162).

The shaping circuit 170 can take a variety of forms depending upon the requirements of a given application; example constructions include a single resistor 184 coupled across the FOS conductors (FIG. 6), an active filter 187 (FIG. 7), a high order complex network 188 (FIG. 8), and a section of additional transmission line 190 (FIG. 9). Although not shown in FIGS. 4 and 5, it is contemplated that the shaping circuit 170 can further utilize control inputs provided by the preamp 130 or other circuitry to adaptively shape the write currents as desired.

Because write and read elements are commonly formed using integrated circuit fabrication techniques, the shaping circuit 170 can be readily fabricated at the same time using the same process. Incorporation of the shaping circuit 170 further provides an advantage in that commercially available preamps can be purchased and utilized without the need to configure such preamps for a given application. Moreover, since what matters is the shape of the write current sequence at the write element 168 (and not at the output of the driver 166), locating the shaping circuit 170 within the head assembly 120 provides greater control over the actual write currents that reach the write element 168. Further, the placement of the shaping circuit 170 within the head assembly 120 generally improves the ability to control reflections on the FOS conductors 162.

In view of the foregoing, it will be now be recognized that the present invention is directed to an apparatus for improving write performance in a disc drive. In accordance with preferred embodiments, a disc drive 100 is provided with a rotatable disc 108 comprising a recording surface and an actuator assembly 110 adjacent the disc comprising a flexible suspension assembly 118 and a preamplifier/driver circuit 130 which outputs a series of write currents indicative of data to be written to the recording surface.

The disc drive further has a head assembly 120, supported by the flexible suspension assembly adjacent the recording surface, which includes a write element 168 and a write current shaping circuit 170. The write current shaping circuit modifies the sequence of write currents output by the preamplifier/driver circuit to improve operation of the write element in writing the data to the recording surface in relation to the modified sequence of write currents.

For purposes of the appended claims, the function of the recited "write means" will be understood to be carried out by the disclosed structure of FIGS. 2 and 5 including the interface circuit 132, encoder circuit 134, serializer 136, preamplifier/driver circuit 130, transmission line conductors 162 routed along flexible suspension assembly 118, and head assembly 120 including write element 168 and write current shaping circuit 170. Prior art structures that fail to incorporate the write current shaping circuit into the head assembly at the load end of the transmission line and instead apply shaping at the source end, such as disclosed by U.S. Pat. Nos. 5,434,717; 5,357,379; and 5,880,626 discussed above, are explicitly excluded from the definition of an equivalent.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A read/write head assembly operably configured to be supported over a disc recording surface by a flexible suspension assembly and to write data to the disc recording surface in response to write currents which are supplied to the head assembly by a transmission line which is coupled to the head assembly and routed along the flexible suspension assembly, the head assembly comprising:

a write element, operably coupled to the transmission line, which generates time-varying magnetic fields to selectively magnetize the disc recording surface in response to the write currents; and a write current shaping circuit, operably coupled to the transmission line and to the write element, which modifies write currents received by the head assembly from the transmission line to improve write performance of the write element.

2. The head assembly of claim 1, wherein the write current shaping circuit is fabricated as part of an integrated circuit which also includes the write element.

3. The head assembly of claim 1, wherein the write current shaping circuit comprises a damping resistor.

4. The head assembly of claim 1, wherein the write current shaping circuit comprises an active filter.

5. The head assembly of claim 1, wherein the transmission line comprises a flex-on-suspension construction.

6. The head assembly of claim 1, further comprising a magneto-resistive read element.

7. A disc drive, comprising:

a rotatable disc comprising a recording surface;

an actuator assembly adjacent the disc, comprising a flexible suspension assembly and a preamplifier/driver circuit which outputs a series of write currents indicative of data to be written to the recording surface; and a head assembly, supported by the flexible suspension assembly adjacent the recording surface, comprising a write element and a write current shaping circuit, wherein the write current shaping circuit modifies the sequence of write currents output by the preamplifier/driver circuit to improve operation of the write element to write the data to the recording surface in relation to the modified sequence of write currents.

8. The disc drive of claim 7, wherein the write current shaping circuit is fabricated as part of an integrated circuit which also includes the write element.

9. The disc drive of claim 7, wherein the write current shaping circuit comprises a damping resistor.

10. The disc drive of claim 7, wherein the write current shaping circuit comprises an active filter.

11. The disc drive of claim 7, further comprising a transmission line operably coupled between the write current shaping circuit and the preamplifier/driver circuit, the transmission line comprising a flex-on-suspension construction.

12. The disc drive of claim 7, further comprising a magneto-resistive read element.

13. The disc drive of claim 7, wherein the modified series of write currents has improved settling characteristics as compared to the series of write currents output by the preamplifier/driver circuit.

* * * * *